(12) United States Patent
Ceccarelli et al.

(10) Patent No.: US 10,965,599 B2
(45) Date of Patent: Mar. 30, 2021

(54) METHODS AND ARRANGEMENTS FOR END-POINT MOBILITY OF A TRAFFIC ENGINEERING TUNNEL OF A MULTI-DOMAIN NETWORK

(71) Applicant: Telefonaktiebolaget LM Ericsson (publ), Stockholm (SE)

(72) Inventors: Daniele Ceccarelli, Sollentuna (SE); Giacomo Agostini, Genoa (IT); Manuela Scarella, Genoa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/323,116

(22) PCT Filed: Aug. 29, 2016

(86) PCT No.: PCT/SE2016/050807
§ 371 (c)(1),
(2) Date: Feb. 4, 2019

(87) PCT Pub. No.: WO2018/044209
PCT Pub. Date: Mar. 8, 2018

(65) Prior Publication Data
US 2019/0199638 A1  Jun. 27, 2019

(51) Int. Cl.
*H04L 12/803* (2013.01)
*H04L 12/46* (2006.01)
(Continued)

(52) U.S. Cl.
CPC ........ *H04L 47/125* (2013.01); *H04L 12/4633* (2013.01); *H04L 12/4641* (2013.01);
(Continued)

(58) Field of Classification Search
CPC ............... H04L 47/125; H04L 12/4633; H04L 12/4641; H04L 41/18; H04L 45/42; H04L 45/50
See application file for complete search history.

(56) References Cited

U.S. PATENT DOCUMENTS

2019/0306033 A1* 10/2019 Lee .................... H04L 41/0806

FOREIGN PATENT DOCUMENTS

WO       2016069382 A1    5/2016

OTHER PUBLICATIONS

Ceccarelli, Daniele, et al., "Framework for Abstraction and Control of Traffic Engineered Networks", TEAS Working Group, Internet Draft, Apr. 14, 2016, 1-28.

(Continued)

*Primary Examiner* — Melvin C Marcelo
(74) *Attorney, Agent, or Firm* — Murphy, Bilak & Homiller, PLLC

(57) ABSTRACT

It is disclosed a coordinator (22), a physical network controller (24, 26) and methods therein for enabling end-point mobility of a traffic engineering, TE, tunnel in a multi-domain network. Based on a request for virtual network configuration of one or both of the ingress and the egress end-points of the TE tunnel, the coordinator of a multi-domain network determines 54, S416 a second request for virtualizing said one or both of the ingress and the egress end-points of the TE tunnel. The physical network controller may then virtualize end-points of the TE tunnel, providing a virtualized end-point, VEP, TE tunnel, having end-point mobility capacity. Recovery mechanisms of tunnel paths may be efficiently implemented. The present disclosure also provides scalability improvements and operational expenditure, OPEX, savings, as compared to state of art TE tunnels.

30 Claims, 6 Drawing Sheets

(51) Int. Cl.
   *H04L 12/24* (2006.01)
   *H04L 12/717* (2013.01)
   *H04L 12/723* (2013.01)

(52) U.S. Cl.
   CPC .............. *H04L 41/18* (2013.01); *H04L 45/42* (2013.01); *H04L 45/50* (2013.01)

(56) References Cited

OTHER PUBLICATIONS

El Mghazli, Y., et al., "Framework for Layer 3 Virtual Private Networks (L3VPN) Operations and Management", Network Working Group, RFC: 4176, Oct. 2005, 1-26.

Hertoghs, Y., et al., "A Unified LISP Mapping Database for L2 and L3 Network Virtualization Overlays", Networking Virtualization Overlays Working Group, Internet-Draft, Jul. 21, 2014, 1-24.

Napierala, Maria, et al., "IP-VPN Data Center Problem Statement and Requirements", Network Working Group, Internet Draft, Jun. 12, 2012, 1-17.

* cited by examiner

METHODS AND ARRANGEMENTS FOR END-POINT MOBILITY OF A TRAFFIC ENGINEERING TUNNEL OF A MULTI-DOMAIN NETWORK

TECHNICAL FIELD

This disclosure concerns virtual network configuration related to a traffic engineering (TE) tunnel. More particularly, it concerns virtualizing one or more end-points of the TE tunnel.

BACKGROUND

Today, network control is converging from both a vertical and a horizontal perspective. Convergence from the vertical perspective refers to that there no more any barriers between various domains, technologies, network layers, vendors, et cetera. Convergence from the horizontal perspective refers to that an application/service layer leverages more and more on automatic network programmability, dynamically using physical resources.

Whereas the vertical convergence has been a subject of research for many years and is being increasingly utilized in market products, horizontal convergence is younger and relates to concepts like virtualization and a flexible usage of networks from an application layer providing dynamic services.

In solutions as of today, when a customer asks for connectivity among access points in a provider network, the request typically needs to be translated into a set of commands including creation of a specific tunnel with given characteristics between two end-points, such as Point-to-point (P2P) tunnel, or between one root and many leaves, such as point-to-multi point (P2MP) tunnels.

A tunnel may be considered to a mechanism for transmitting data units between end-points by wrapping data units of the same or higher layers, where end-points are well identified interfaces located in specific nodes. An end-point may be defined as a network arrangement that sources messages labelled from or sinks messages labelled to its identity (ID), and may be regarded as a host.

On top of tunnels, and label switched paths of which the tunnels may be considered to be composed, it is furthermore possible to build services connecting a multiplicity of customer sites or devices, such as Layer 3 Virtual private networks (L3VPN) and virtual networks.

Tunnels of today are hence used to connect fixed locations. This is not an issue when a network provider needs to guarantee connectivity between a number of the customer's sites or between one of his sites and the Internet.

FIG. 1 schematically illustrates an example of a 5G network, wherein label switched paths (LSPs) define TE tunnels. A home site is connected to the Internet via LSP1, an office site 1 is connected to the Internet via a LSP2 and an office site 2 is connected to the Internet via a LSP3. If a user is moving between said sites, the bandwidth in the transport network with negotiated service level agreements (SLAs) may be required to move along with the user.

FIG. 2 illustrates two network domains and a schematic control plane, which relate to network function virtualization. There is no more a need that a site A of a customer needs connectivity towards a given datacentre (DC). Thanks to inter-data centre connectivity capabilities, a virtual network function (VNF) may be moved between DCs. This may be performed to achieve an improved employment of the network or recovery mechanism for the VNF between DCs.

Suppose that a customer or end user needs a certain VNF to be instantiated for originating from his site CE1. It is further irrelevant whether the certain VNF is instantiated in DC1, DC2 or DC3, as long as the SLA, e.g. delay is met. Within FIG. 2, given a status of the network, an operator may suggest to have the VNF instantiated in DC2. If the network evolves, a need to move the VNF from DC2 to a different DC, with a consequent move of the LSP connecting the CE1 and the VNF, may arise.

In such cases, an operator would be required to manually change a configuration of the tunnel choosing different physical resources as egress point.

There is hence a need to address at least some of the issues outlined above.

SUMMARY

It is an object of exemplary embodiments herein to address at least some of the issues outlined above and to provide end-point mobility to a traffic engineering tunnel in abstraction and control of traffic engineering networks.

This object and others are achieved by attached independent claims and by the exemplary embodiments according to the dependent claims.

According to an aspect, the exemplary embodiments provide a method for enabling end-point mobility of a traffic engineering tunnel in a multi-domain network. The method is performed by a coordinator of the multi-domain network. The traffic engineering tunnel has an ingress end-point and an egress end-point. The method comprises receiving a first request for a virtual network configuration of one or both of the ingress and the egress end-points of the traffic engineering tunnel. The method also comprises determining a second request for virtualizing said one or both of the ingress and the egress end-points of the traffic engineering tunnel, based on the first request. In addition, the method comprises sending the second request to a physical network controller in the multi-domain network.

According to another aspect, the exemplary embodiments provide a method for providing end-point mobility of a traffic engineering tunnel in a multi-domain network. The method is performed by a physical network controller and the traffic engineering tunnel has an ingress end-point and an egress end-point. The method comprises receiving, from a coordinator of a multi-domain network, a request for virtualizing said one or both of the ingress and the egress end-points of the traffic engineering tunnel. The method also comprises virtualizing said one or both of the ingress and the egress end-points of the traffic engineering tunnel.

According to another aspect, the exemplary embodiments provide an arrangement that is capable of enabling end-point mobility of a traffic engineering tunnel in a multi-domain network, and where the traffic engineering tunnel has an ingress end-point and an egress end-point. The arrangement comprises a processing circuit and a memory circuit. The memory circuit has instructions being executable by the processor circuit. When executing the instructions, the processor circuit is configured to receive a first request for a virtual network configuration of one or both of the ingress and the egress end-points of the traffic engineering tunnel. When executing the instructions, the processor circuit is also configured to determine a second request for virtualizing said one or both of the ingress and the egress end-points of the traffic engineering tunnel, based on the first request. In addition, when executing the instructions, the processor circuit is configured to send the second request to a physical network controller in the multi-domain network.

According to yet another aspect, the exemplary embodiments provide an arrangement that is capable of providing end-point mobility of a traffic engineering tunnel in a multi-domain network, and where the traffic engineering tunnel has an ingress end-point and an egress end-point. The arrangement comprises a processing circuit and a memory circuit. The memory circuit has instructions being executable by the processor circuit. When executing the instructions, the processor circuit is configured to receive from a coordinator of a multi-domain network, a request for virtualizing said one or both of the ingress and the egress end-points of the traffic engineering tunnel. Also, when executing the instructions, the processor circuit is configured to virtualize said one or both of the ingress and the egress end-points of the traffic engineering tunnel.

According to yet another aspect, the exemplary embodiments provide a coordinator of a multi-domain network. The coordinator is capable to enable end-point mobility of a traffic engineering tunnel in the multi-domain network. The traffic engineering tunnel has an ingress end-point and an egress end-point. The coordinator of the multi-domain network comprises a first module, a second module and a third module. The first module is adapted to receive a first request for a virtual network configuration of one or both of the ingress and the egress end-points of the traffic engineering tunnel. The second module is adapted to determine a second request for virtualizing said one or both of the ingress and the egress end-points of the traffic engineering tunnel, based on the first request. The third module is adapted to send the second request to a physical network controller in the multi-domain network.

According to yet another aspect, the exemplary embodiments provide a physical network controller that is capable to provide end-point mobility of a traffic engineering tunnel in the multi-domain network. The traffic engineering tunnel has an ingress end-point and an egress end-point. The physical network controller of the multi-domain network comprises a first module, and a second module. The first module is adapted to receive from a coordinator of a multi-domain network, a request for virtualizing said one or both of the ingress and the egress end-points of the traffic engineering tunnel. The second module is adapted to virtualize said one or both of the ingress and the egress end-points of the traffic engineering tunnel.

The present disclosure also comprises a coordinator of a multi-domain network. The coordinator is capable to enable end-point mobility of a traffic engineering tunnel in the multi-domain network. The traffic engineering tunnel has an ingress end-point and an egress end-point. The coordinator of the multi-domain network is further adapted to receive a first request for a virtual network configuration of one or both of the ingress and the egress end-points of the traffic engineering tunnel. The coordinator of the multi-domain network is also adapted to determine a second request for virtualizing said one or both of the ingress and the egress end-points of the traffic engineering tunnel, based on the first request. In addition, the coordinator of the multi-domain network is further adapted to send the second request to a physical network controller in the multi-domain network.

The present disclosure also comprises a physical network controller of a multi-domain network. The controller is capable to provide end-point mobility of a traffic engineering tunnel in the multi-domain network. The traffic engineering tunnel has an ingress end-point and an egress end-point. The controller is further adapted to receive from a coordinator of a multi-domain network, a request for virtualizing said one or both of the ingress and the egress end-points of the traffic engineering tunnel. The controller is further adapted to virtualize said one or both of the ingress and the egress end-points of the traffic engineering tunnel.

Advantages of the present disclosure comprise:

It is advantageous that the present disclosure is applicable to existing networks without meeting any traffic requirements, as state of the art traffic engineering tunnels may be modelled as traffic engineering tunnels with virtualized end-points, where a virtualized end-point is composed of by a single fixed node.

It is a further advantage that traffic engineering tunnel end-points may be chosen dynamically.

Moreover, recovery mechanisms may be efficiently implemented, which is another advantage.

BRIEF DESCRIPTION OF THE DRAWINGS

Embodiments will now be described in more detail, and with reference to the accompanying drawings, in which.

DETAILED DESCRIPTION

In the following description, exemplary embodiments will be described in more detail, with reference to accompanying drawings. For the purpose of explanation and not limitation, specific details are further set forth, such as particular examples and techniques in order to provide a thorough understanding.

As indicated above, end-points of current TE tunnels, irrespective of the type of tunnel, for instance multi-layer, multi-technology, or multi-domain tunnels or protected tunnels, have fixed end-points.

Figure 1:
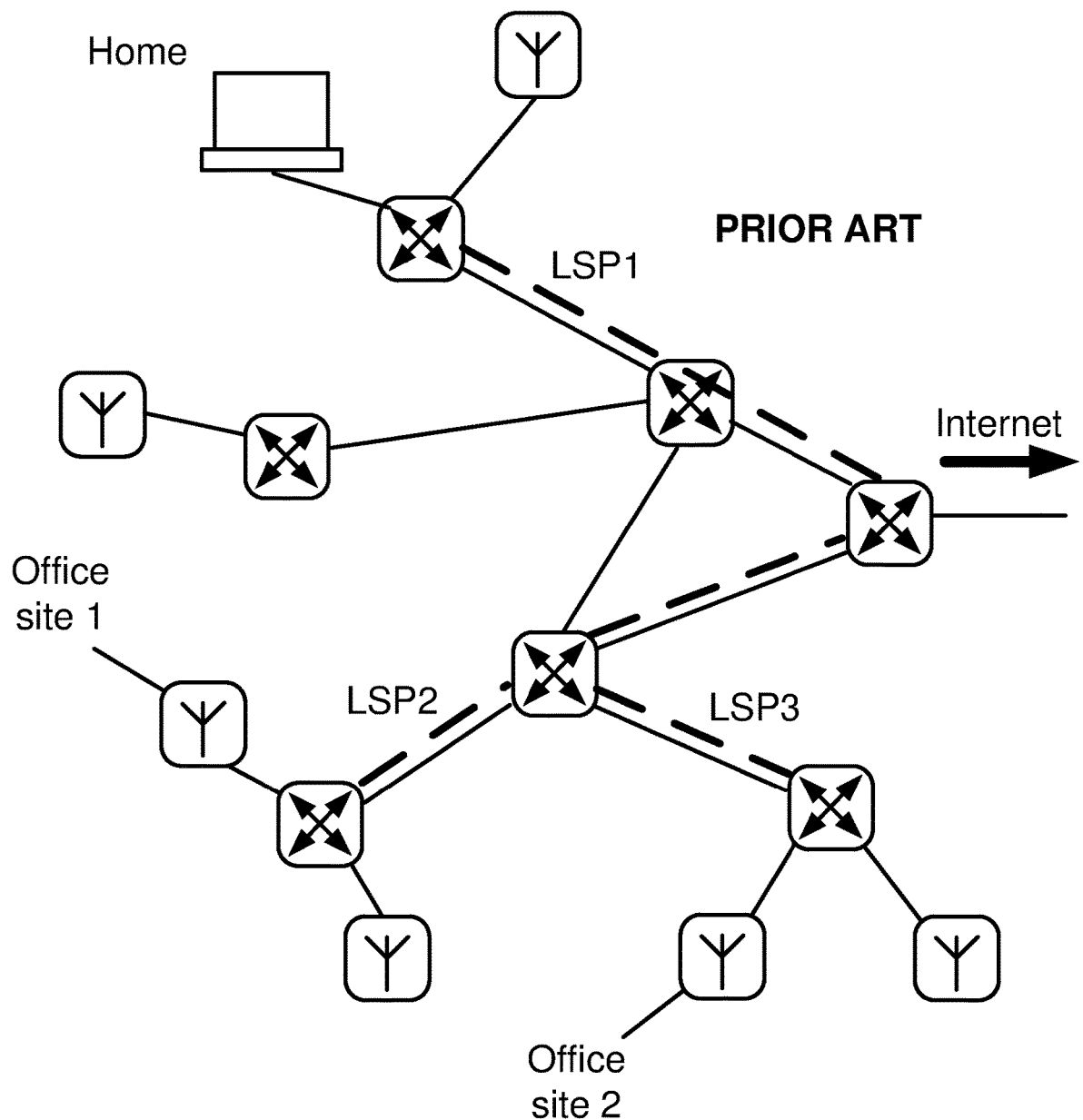
FIG. 1 schematically illustrates an example of multiple label switched paths for a 5G network.
Figure 2:
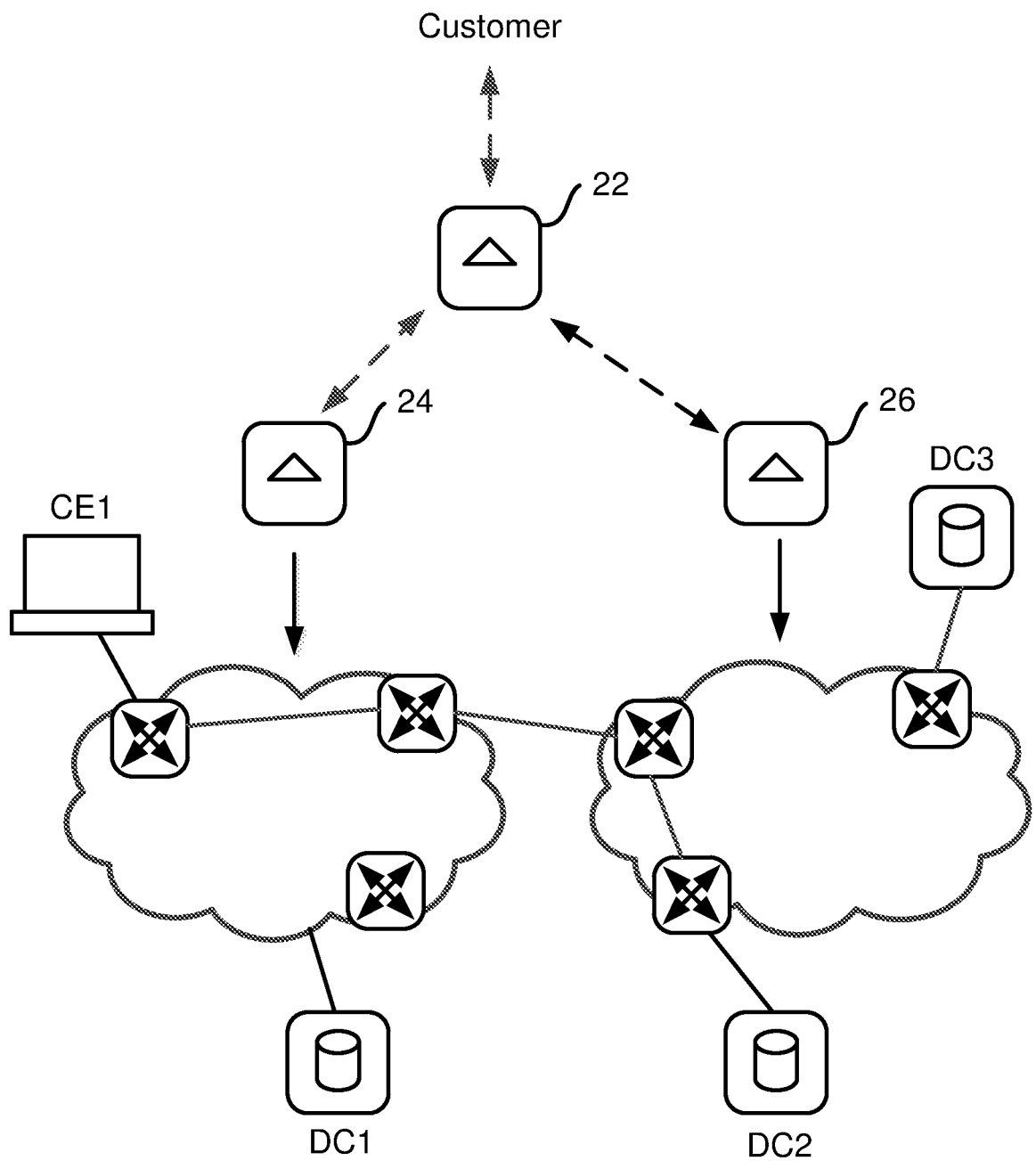
FIG. 2 illustrates an example of two network domains and a schematic control plane, which relate to network function virtualization.

Also, as discussed in connection with FIG. 2, if a network evolves, a need to move the VNF from one DC to a different DC, with a consequent move of the LSP connecting a customer end-point and a VNF, may arise.

Moreover, multiple features may be created such as a dynamic choice of tunnel end-points depending on the evolution of the status of a network. In addition, recovery mechanisms between VNFs and DCs may be provided. For example, a VNF being instantiated on DC1 and VNF protection instantiated on DC2, where a feedback mechanism may trigger a bandwidth in a transport network to be moved from DC1 to DC2 accordingly.

According to the present disclosure, end-point mobility is provided by which a configuration of a TE tunnel may be changed by choosing different physical resources as one or both of the ingress point and egress point of the TE tunnel, without manual intervention by the operator.

End-point mobility of a TE tunnel is herein provided by virtualizing one or both of the ingress and egress point of the TE tunnel. End-points may be dynamically allocated or change with an evolution of the network automatically, i.e. without operator intervention.

By virtualizing end-points of a TE tunnel, a virtualized end-point (VEP) TE tunnel is provided. Virtual end-points may comprise one or more physical nodes among which to choose from. Also, the introduction of virtual end-points allows defining a relationship between working (or active) end-point and protection end-points, which may be used in recovery mechanisms, for example.

The introduction of VEP TE tunnels is applicable to the hierarchy of software defined networks (SDN) controllers in an abstraction and control of TE networks (ACTN) environment. Entities 24 and 26 as illustrated in FIG. 2 may represent physical network controllers, whereas 22 may represent a coordinator in a multi-domain network, such as a multi-domain service coordinator (MDSC).

The present disclosure thus concerns virtualizing one or more end-points of a TE tunnel, thereby providing end-point mobility of said TE tunnel. By providing virtual end-points (VEP) traffic engineering (TE) tunnels are modified to become VEP TE tunnels. A VEP TE tunnel has a VEP in one or both of the ingress and egress end-points. A VEP is thus a virtual end-point, in contrast to a fixed node end-point, of state of the art TE tunnels.

It is to be noted that virtualization of an end-point, as here referred to, does not refer to a sum of slices of network nodes into a virtual node, but to the definition of a container in the sense of a virtual entity into which a number of real nodes may be inserted.

Within such a container a relationship between some or all of these real nodes may be provided to provide access point protection functionality. This will be described down below.

Figure 3A:
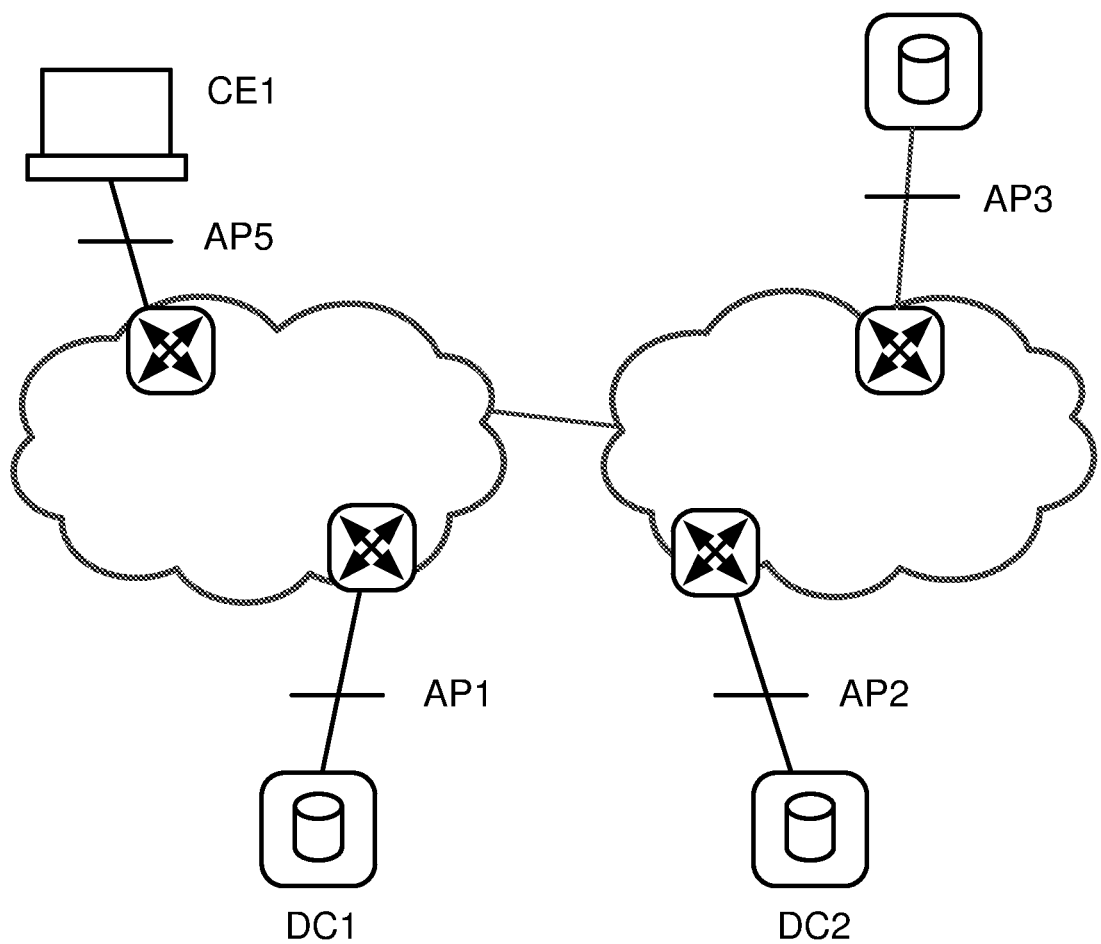
FIG. 3A presents said two domains, according to an example of the present disclosure.

FIG. 3A presents said two network domains, according to an example of the present disclosure. The domains may belong to an abstraction and control of TE networks (ACTN).

FIG. 3A illustrates a customer end-point (CE1) that is connected via an access point AP5 to a first network domain. A certain functionality may be available from DC1 being connected to said network domain via AP1. The same functionality may also be available from DC2 and DC3 via AP2 and AP3, respectively, from another network domain.

Suppose now that the customer requires traffic generated from one of its sites, for instance CE1, to use a virtual network function (VNF) located somewhere in a cloud network.

A request may then be sent to the north bound interface of a coordinator of the multi-domain network, requesting a point-to-point virtual network configuration and wherein the request may comprise a list of potential egress access points (APs) from which the requested VNF is available. In this case, the VNF is available from DC1 of one domain, and from DC2 and DC3 from said other domain.

The coordinator may then process the received request and determines a second request for virtualizing of one or both of the ingress and egress end-points of a TE tunnel. The virtualizing of said one or both of the ingress and egress end-points of the TE tunnel may thus comprise defining a virtual end-point (VEP) of one or both of said ingress and egress end-points of the TE tunnel.

Figure 3B:
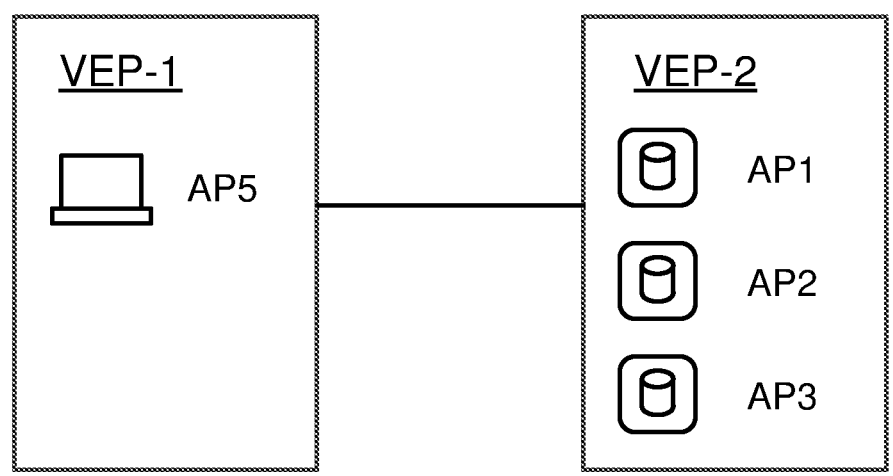
FIG. 3B illustrates virtualized end-points (VEPs) corresponding to the example of FIG. 3A.

FIG. 3B schematically illustrates an example of VEPs of the TE tunnel involving the two network domains from FIG. 3A.

In this example, the VEP TE tunnel is being defined between a first VEP (VEP-1) that include a single entity AP5, and a second VEP (VEP-2) that comprises AP1, AP2 and AP3.

The second request for virtualizing end-points may further comprise constraints on computation of path computation. Examples of constraints comprise objective functions, such as metrics optimization, and TE metric bounds, such as upper limits of acceptable delays. The computation of a VEP TE tunnel may also be based on parameters related to end-point selection and/or end-point protection.

Thus, when performing a constrained path computation, a path that minimizes a certain metric between given ingress and egress end-points may be requested. The VEP TE tunnel may provide an enhanced response to this request, in the sense that not only is the VEP TE tunnel provided between proper ingress and egress end-points, but also proper real end-points or APs within each VEP, may be selected, resulting in a minimization of said metric.

The virtual end-point VEP-2 of FIG. 3B comprising AP1, AP2 and AP3, may thus comprise one or more APs with minimum delay metric.

Moreover, as indicated above, a VEP TE tunnel has a further advantage of being able to provide end-point protection functionality. A VEP TE tunnel may specify a nominal EP and one or more protection EP, in a relationship. Having such as relationship enables traffic to be moved automatically from a working path that involves, for instance a first end-point of a VEP, to a path leading to a protection EP. This protection EP may be a primary protection EP, which may itself be protected by a secondary EP, and so on. An array of a hierarchical protection may thus be provided by using a VEP TE tunnel.

A switch of end-points providing the protection may be triggered by fault events, but may also be based on a policy based events, defined both from inside or outside the network.

In the case a path between AP5 of VEP-1 and AP2 of VEP-2 may be calculated, by using path computation constraints on paths the two APs. Further, a policy may hence be configured so that the path AP5-AP1 may be used as a protection path in the case event X happens or, for instance, the path AP5-AP3 may be used as a protection path is the case event Y happens. It is noted that events X and Y may be failure events, but may alternatively be a change in network characteristics, for instance metric changes or paths being rerouted, with the implication that end-to-end constraints first specified are no more met. Events X and Y may also comprise an external event, for example that a VNF that is serving a customer site has moved from DC2 to for instance DC1. The path AP5-AP2 for provision of the VNF may therefore be changed to AP5-AP1, in such an event.

All considerations applied above are also applicable to scenarios in which VEP-1 comprises more than one AP. For instance, when a user or customer is moving between different locations or sites, a VEP TE tunnel may be provided between the a VEP of the ingress end-point, where the ingress VEP comprises more than a single AP.

The present disclosure is also applicable to scenarios in which virtualizing of both the ingress and the egress end-point of a TEW tunnel is performed, and where the ingress and egress VEP each comprise multiple APs. In such a case, the number of possible combinations of ingress and egress AP increases significantly. Mechanisms for management of such combinations may need to be developed.

According to the present disclosure, one or two end-points of a TE tunnel may be virtualized into a VEP, possibly into a container comprising real node, so that a working path within the VEP TE tunnel may be moved from a certain pair of physical end-points to another pair of physical end-points. This move may depend on one or more policies, faults and events of any kind.

The present disclosure thus provides end-point mobility in use case such as 5G mobile users and VNF mobility among DCs.

Figure 4:
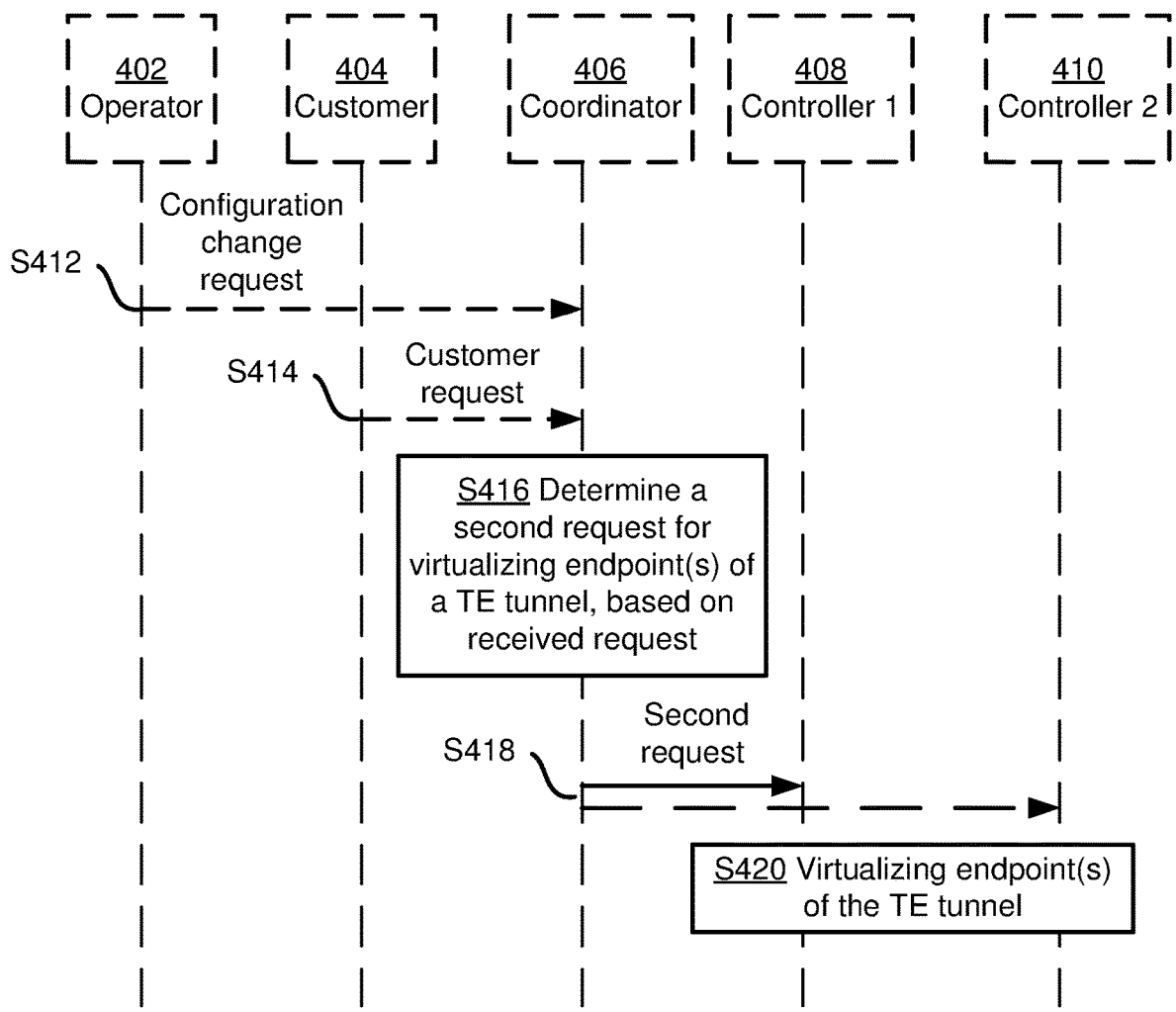
FIG. 4 illustrates a handshake diagram according to some examples of the present disclosure.

FIG. 4 schematically presents a signalling diagram related to provision of end-point mobility as described above. Signalling may be performed between an operator 402, a customer site 404, a coordinator 406, a controller 1, 408 and a controller 2, 410.

In S412, the operator 402 may send a request for changing a network configuration to the coordinator 406.

In S414, the customer site 404 may send a request to the coordinator 406.

Having received on or both of the request in S412 or S414, the coordinator 406 may, in S416, determine a second request for virtualizing one or both of the ingress and the egress end-points of a TE tunnel, based on the received request(s).

In S418 the coordinator 406 may send the second request to the controller 1, 408, and possibly also to the controller 2, 410.

In S420, controllers 1 and/or 2, 408, 410 may then virtualize one or both of the ingress and egress end-points of the TE tunnel, based on the received second request.

Figure 5:
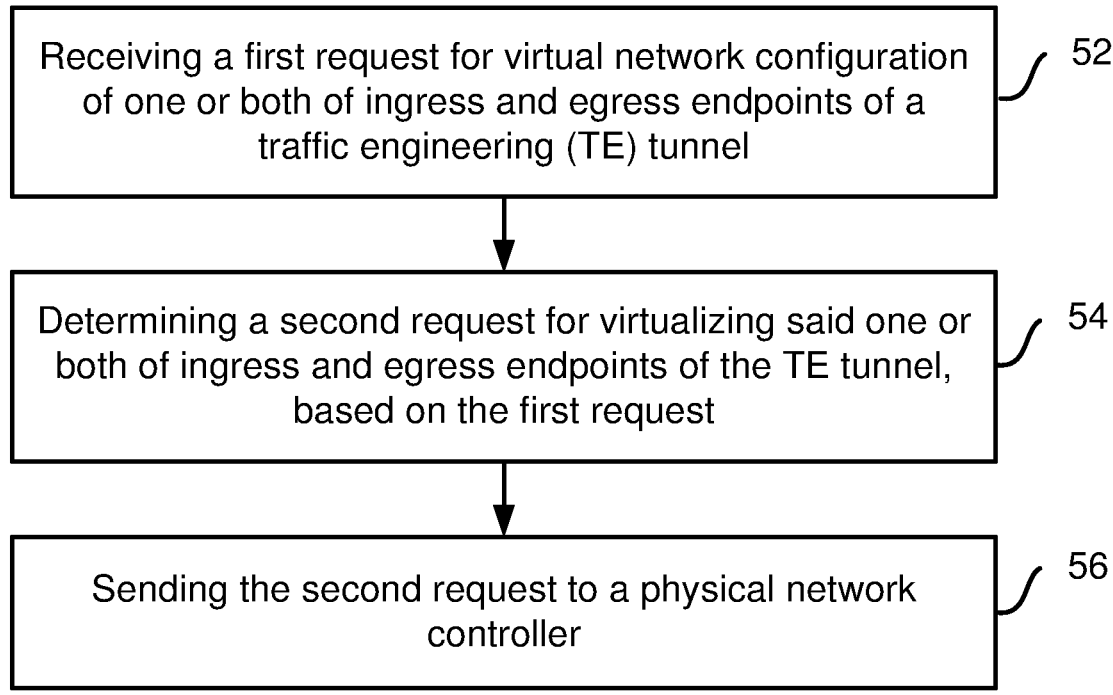
FIGS. 5 and 6 present flow charts of actions of methods, according to some examples of the present disclosure.

FIG. 5 presents a flow chart of actions within a method for enabling end-point mobility of a TE tunnel in a multi-domain network, where the method is being performed by a coordinator of the multi-domain network, and where the TE tunnel has an ingress end-point and an egress end-point.

Action 52: The method comprises receiving a first request for a virtual network configuration of one or both of the ingress and the egress end-points of the TE tunnel. The Action 54: The method also comprises determining a second request for virtualizing said one or both of the ingress and the egress end-points of the TE tunnel, based on the first request.

Action 56: In addition, the method comprises sending the second request to a physical network controller in the multi-domain network.

Action 54 of determining the second request for virtualizing said one or both of the ingress and the egress end-points of the TE tunnel, may comprise defining a VEP of said one or both of the ingress and the egress end-points of the TE tunnel, based on a list of potential access points.

The second request may further comprise a request for selecting one or more access points of the VEP of said one or both of the ingress and egress end-points of the TE tunnel, based on an objective function of the ingress and egress end-points.

The request for selecting one or more access points of the VEP, may further be based on a policy based on events of the objective function.

The TE tunnel may be an established TE tunnel and the second request may be a request for modifying said established TE tunnel into a VEP TE-tunnel.

Action 52 of receiving the first request may comprise receiving the list of potential access points. In this case, the first request may comprise a request for establishing the TE tunnel having a virtualized end-point, VEP, of one or both of the ingress and the egress end-points. Thus, the request may be a request to establish a VEP TE tunnel.

Action 52 of receiving the first request may comprise receiving said first request from a customer network controller, based on a customer input.

Action 52 of receiving the first request may comprise receiving said first request from an operator using the multi-domain network.

The VEP TE-tunnel may be a label switched path (LSP).

Figure 6:
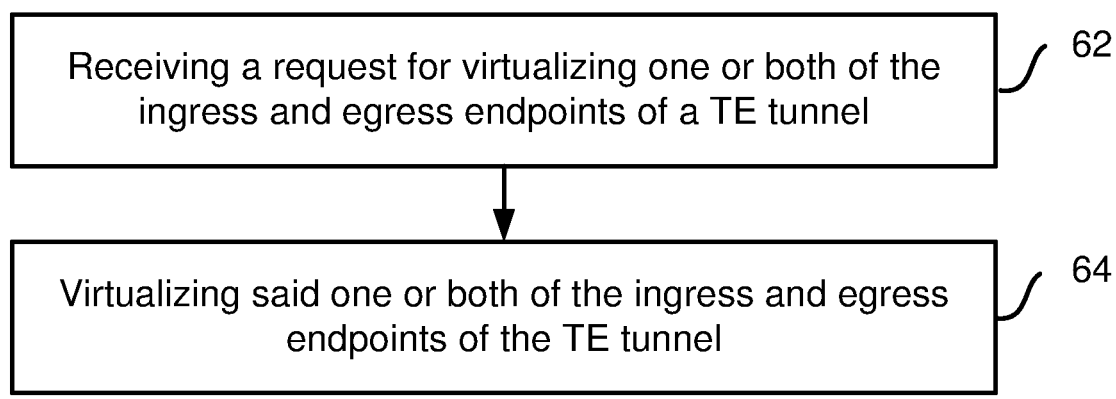

FIG. 6 presents a flow chart of actions within a method for providing end-point mobility of a TE tunnel in a multi-domain network, where the method is being performed by a physical network controller (PNC) and where the TE tunnel has an ingress end-point and an egress end-point.

Action 62: The method comprises receiving, from a coordinator of a multi-domain network, a request for virtualizing said one or both of the ingress and the egress end-points of the TE tunnel.

Action 64: The method also comprises virtualizing said one or both of the ingress and the egress end-points of the TE tunnel.

Action 62 of receiving the request for virtualizing said one or both of the ingress and the egress end-points of the TE tunnel, may comprise receiving a definition of a VEP of said one or both of the ingress and the egress end-points of the TE tunnel, wherein action 64 of virtualizing said one or both of the ingress and the egress end-points of the TE tunnel, comprises implementing the VEP of said one or both of the ingress and the egress end-points of the TE tunnel.

The request for virtualizing said one or both of the ingress and the egress end-points of the TE tunnel, may further comprise a request for selecting one or more access points of the VEP of said one or both of the ingress and egress end-points of the TE tunnel, and wherein action 64 virtualizing comprises selecting one or more access points of the VEP of said one or both of the ingress and egress end-points of the TE tunnel.

The TE tunnel may be an established TE tunnel and the request for virtualizing said one or both of the ingress and the egress end-points of the TE tunnel may be a request for modifying said established TE tunnel into a VEP TE-tunnel.

The request for virtualizing said one or both of the ingress and the egress end-points of the TE tunnel may comprise a request for establishing the TE tunnel having a VEP of one or both of the ingress and the egress end-points.

The present disclosure also comprises a computer program that comprising instructions which, when executed on at least one processor, cause the at least one processor to carry out the methods as presents in connection with FIGS. 5 and 6.

It is also disclosed a computer-readable storage medium having stored the computer program.

The present disclosure also comprises a computer program product comprising the computer-readable storage medium and the computer program, as above, wherein the computer program is stored on the computer readable storage medium.

Figure 7:
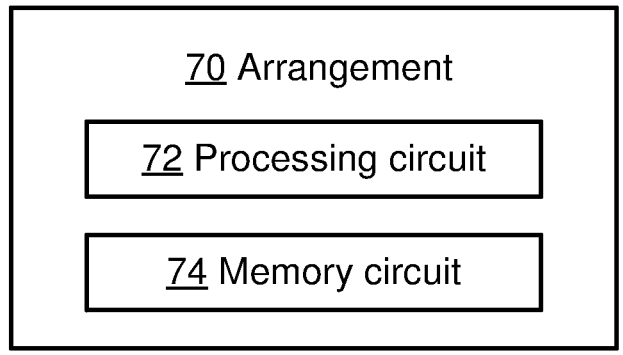
FIG. 7 schematically presents an arrangement, according to some examples of the present disclosure.

FIG. 7 schematically presents an arrangement 70 that is capable of enabling end-point mobility of a TE tunnel in a multi-domain network, and where the TE tunnel has an ingress end-point and an egress end-point. The arrangement comprises a processor circuit 72 and a memory 74 having instructions executable by the processor circuit 72. When executing the instructions, the processor circuit 72 is configured to receive a first request for a virtual network configuration of one or both of the ingress and the egress end-points of the TE tunnel. When executing the instructions, the processor circuit 72 is also configured to determine a second request for virtualizing said one or both of the ingress and the egress end-points of the TE tunnel, based on the first request. In addition, when executing the instructions, the processor circuit 72 is configured to send the second request to a physical network controller in the multi-domain network.

The processor circuit 72 when executing the instructions may be configured to define a VEP of said one or both of the ingress and the egress end-points of the TE tunnel, based on a list of potential access points.

The second request may further comprise a request for selecting one or more access points of the VEP of said one or both of the ingress and egress end-points of the TE tunnel, based on an objective function of the ingress and egress end-points.

The request for selecting may further be based on a policy based on events of the objective function.

The TE tunnel may be an established TE tunnel and the second request may in this case comprise a request for modifying said established TE tunnel into a VEP TE-tunnel.

The processor circuit 72 when executing the instructions may be configured to receive the list of potential access points within the first request.

The first request may comprise a request for establishing the TE tunnel having a VEP of one or both of the ingress and the egress end-points.

The processor circuit 72 when executing the instructions may be configured to receive said first request from a customer network controller, based on a customer input.

The processor circuit 72 when executing the instructions may be configured to receive said first request from an operator using the multi-domain network.

The VEP TE-tunnel may be a label switched path (LSP).

The VEP of said one or both of the ingress and the egress end-points, may comprise a container.

The arrangement may comprise a multi-domain service coordinator (MDSC).

Also, FIG. 7 may also schematically represent an arrangement 70 that is capable of providing end-point mobility of a TE tunnel in a multi-domain network, and where the TE tunnel has an ingress end-point and an egress end-point. The arrangement comprises a processor circuit 72 and a memory 74 having instructions executable by the processor circuit 72. When executing the instructions, the processor circuit 72 is configured to receive from a coordinator of a multi-domain network, a request for virtualizing said one or both of the ingress and the egress end-points of the TE tunnel. Also, when executing the instructions, the processor circuit 72 is configured to virtualize said one or both of the ingress and the egress end-points of the TE tunnel.

The arrangement may comprise a physical network controller.

The processor circuit 72 when executing the instructions may be configured to receive a definition of a VEP of said one or both of the ingress and the egress end-points of the TE tunnel, and to implement the VEP of said one or both of the ingress and the egress end-points of the TE tunnel.

The request for virtualizing said one or both of the ingress and the egress end-points of the TE tunnel may further comprise a request for selecting one or more access points of the VEP of said one or both of the ingress and egress end-points of the TE tunnel, and wherein virtualizing comprises selecting one or more access points of the VEP of said one or both of the ingress and egress end-points of the TE tunnel.

The TE tunnel may be an established TE tunnel and the request for virtualizing said one or both of the ingress and the egress end-points of the TE tunnel may comprise a request for modifying said established TE tunnel into a VEP TE-tunnel.

The request for virtualizing said one or both of the ingress and the egress end-points of the TE tunnel may comprise a request for establishing the TE tunnel having a VEP of one or both of the ingress and the egress end-points.

The VEP of said one or both of the ingress and the egress end-points, may comprise a container.

Figure 8:
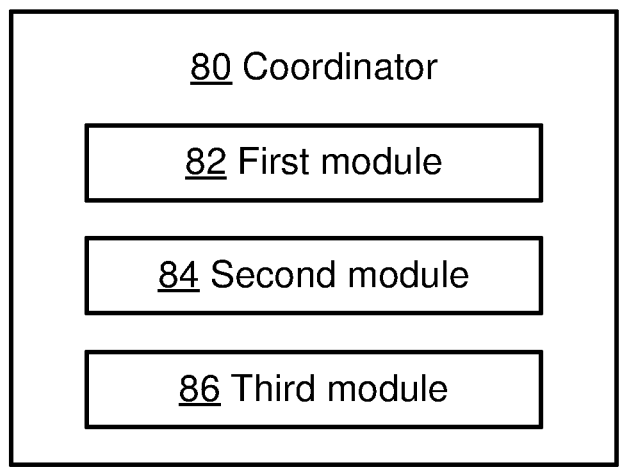
FIGS. 8 and 9 schematically present a coordinator and a controller, respectively, according to some examples of the present disclosure.

FIG. 8 schematically presents a coordinator 80 of a multi-domain network. The coordinator is capable to enable end-point mobility of a TE tunnel in the multi-domain network. The TE tunnel has an ingress end-point and an egress end-point. The coordinator of the multi-domain network comprises a first module 82, a second module 84 and a third module 86. The first module 82 is adapted to receive a first request for a virtual network configuration of one or both of the ingress and the egress end-points of the TE tunnel. The second module 84 is adapted to determine a second request for virtualizing said one or both of the ingress and the egress end-points of the TE tunnel, based on the first request. The third module 86 is adapted to send the second request to a physical network controller in the multi-domain network.

Figure 9:
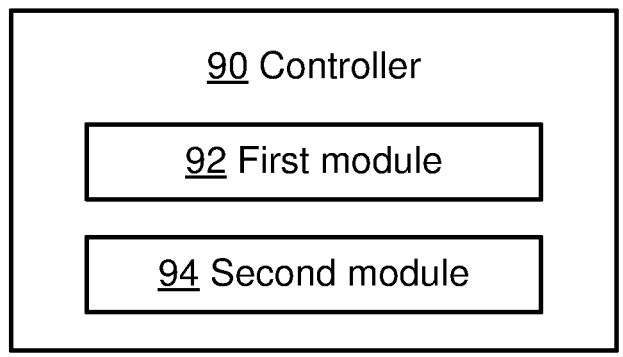

FIG. 9 schematically presents a physical network controller 90 capable to provide end-point mobility of a TE tunnel in the multi-domain network. The TE tunnel has an ingress end-point and an egress end-point. The physical network controller of the multi-domain network comprises a first module 92, and a second module 94. The first module 92 is adapted to receive from a coordinator of a multi-domain network, a request for virtualizing said one or both of the ingress and the egress end-points of the TE tunnel. The second module 94 is adapted to virtualize said one or both of the ingress and the egress end-points of the TE tunnel.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart actions. It will be understood that in many cases, certain actions may be combined together such that multiple actions shown in the flowcharts may be performed as a single action. Also, certain actions may be broken into additional sub-components to be performed separately. In some instances, the order of the actions may be rearranged and certain actions may be omitted entirely. Also, the methods described herein are to be understood to be open-ended, such that additional actions to those shown and described herein may also be performed.

The present disclosure has the following advantages:

The present disclosure is advantageously applicable to existing networks without meeting any traffic requirements, as state of the art TE tunnels may be modelled as TE tunnels with virtualized end-points, where a virtualized end-point is composed of by a single fixed node.

TE tunnel end-points may be chosen dynamically.

Recovery mechanisms may be efficiently implemented.

Scalability improvements and OPEX savings, as compared to setting up a single tunnel or each pair of possible ingress and egress end-points and providing them with complex resource sharing mechanisms. Single tunnels for each pair of possible ingress and egress end-point, may also prevent multiple bandwidth allocation in the network, and would not allow for protection mechanisms between such tunnels.

It may be further noted that the above described embodiments are only given as examples and should not be limiting to the present exemplary embodiments, since other solutions, uses, objectives, and functions are apparent within the scope of the embodiments as claimed in the accompanying patent claims.

ABBREVIATIONS

ACTN abstraction and control of TE networks
AP access point
CE customer EP
DC data centre
EP end-point
ID identity
L3VPN layer 3 virtual private network
LSP label switched path
OPEX operational expenditure
P2P point to point
P2MP point to multi-point
SDN software defined network
SLA service level agreement
TE traffic engineering
VEP virtualized EP
VNF virtual network function

The invention claimed is:

1. A method for enabling end-point mobility of a traffic engineering, TE, tunnel in a multi-domain network, the method being performed by a coordinator of the multi-domain network, where the TE tunnel has an ingress end-point and an egress end-point, the method comprising:
receiving a first request for a virtual network configuration of one or both of the ingress and the egress end-points of the TE tunnel;
determining a second request for virtualizing said one or both of the ingress and the egress end-points of the TE tunnel, based on the first request; and
sending the second request to a physical network controller in the multi-domain network.

2. The method according to claim 1, wherein determining the second request for virtualizing said one or both of the ingress and the egress end-points of the TE tunnel, comprises defining a virtualized end-point, VEP, of said one or both of the ingress and the egress end-points of the TE tunnel, based on a list of potential access points.

3. The method according to claim 2, wherein the second request further comprises a request for selecting one or more access points of the VEP of said one or both of the ingress and egress end-points of the TE tunnel, based on an objective function of the ingress and egress end-points.

4. The method according to claim 3, wherein the request for selecting further is based on a policy based on events of the objective function.

5. The method according to claim 1, where the TE tunnel is an established TE tunnel and the second request is a request for modifying said established TE tunnel into a VEP TE-tunnel.

6. The method according to claim 5, wherein the VEP TE-tunnel is a label switched path, LSP.

7. The method according to claim 1, wherein the first request comprises a request for establishing the TE tunnel having a virtualized end-point, VEP, of one or both of the ingress and the egress end-points.

8. The method according to claim 1, wherein receiving the first request comprises either:
receiving said first request from a customer network controller, based on a customer input; or
receiving said first request from an operator using the multi-domain network.

9. A method for providing end-point mobility of a traffic engineering, TE, tunnel in a multi-domain network, the method being performed by a physical network controller, PNC, where the TE tunnel has an ingress end-point and an egress end-point, the method comprising:
receiving, from a coordinator of a multi-domain network, a request for virtualizing said one or both of the ingress and the egress end-points of the TE tunnel; and
virtualizing said one or both of the ingress and the egress end-points of the TE tunnel.

10. The method according to claim 9, wherein receiving the request comprises receiving a definition of a virtualized end-point, VEP, of said one or both of the ingress and the egress end-points of the TE tunnel, and wherein virtualizing said one or both of the ingress and the egress end-points of the TE tunnel, comprises implementing the virtualized end-point, VEP, of said one or both of the ingress and the egress end-points of the TE tunnel.

11. The method according to claim 9, wherein the request further comprises a request for selecting one or more access points of the VEP of said one or both of the ingress and egress end-points of the TE tunnel, and wherein virtualizing comprises selecting one or more access points of the VEP of said one or both of the ingress and egress end-points of the TE tunnel.

12. The method according to claim 9, where the TE tunnel is an established TE tunnel and the request is a request for modifying said established TE tunnel into a VEP TE-tunnel.

13. The method according to claim 9, where the request comprises a request for establishing the TE tunnel having a virtualized end-point, VEP, of one or both of the ingress and the egress end-points.

14. A coordinator of a multi-domain network, the coordinator being capable to enable end-point mobility of a traffic engineering, TE, tunnel in the multi-domain network, where the TE tunnel has an ingress end-point and an egress end-point, the coordinator of the multi-domain network comprising:
a processor circuit; and
a memory having instructions executable by the processor circuit, wherein said processor circuit when executing the instructions is configured to:
receive a first request for a virtual network configuration of one or both of the ingress and the egress end-points of the TE tunnel;
determine a second request for virtualizing said one or both of the ingress and the egress end-points of the TE tunnel, based on the first request; and
send the second request to a physical network controller in the multi-domain network.

15. The coordinator according to claim 14, wherein said processor circuit when executing the instructions is configured to determine the second request for virtualizing said one or both of the ingress and the egress end-points of the TE tunnel, by defining a virtualized end-point, VEP, of said one or both of the ingress and the egress end-points of the TE tunnel, based on a list of potential access points.

16. The coordinator according to claim 15, wherein the second request further comprises a request for selecting one or more access points of the VEP of said one or both of the ingress and egress end-points of the TE tunnel, based on an objective function of the ingress and egress end-points.

17. The coordinator according to claim 16, wherein the request for selecting further is based on a policy based on events of the objective function.

18. The coordinator according to claim 14, where the TE tunnel is an established TE tunnel and the second request is a request for modifying said established TE tunnel into a VEP TE-tunnel.

19. The coordinator according to claim 18, wherein the VEP TE-tunnel is a label switched path, LSP.

20. The coordinator according to claim 14, wherein the first request comprises a request for establishing the TE tunnel having a virtualized end-point, VEP, of one or both of the ingress and the egress end-points.

21. The coordinator according to claim 14, wherein said processor circuit when executing the instructions is configured to receive the first request by:
   receiving said first request from a customer network controller, based on a customer input; or
   receiving said first request from an operator using the multi-domain network.

22. The coordinator according to claim 14, wherein each domain belongs to an abstraction and control of TE network, ACTN, wherein the second request comprises a definition of a virtualized end-point, VEP, TE tunnel to trigger the physical network controller to implement the VEP TE tunnel.

23. The coordinator according to claim 15, wherein defining a VEP of said one or both of the ingress and the egress end-points of the TE tunnel comprises defining the VEP as a virtual entity that contains one or more of the potential access points in the list.

24. A physical network controller capable to provide end-point mobility of a traffic engineering, TE, tunnel in the multi-domain network, where the TE tunnel has an ingress end-point and an egress end-point, the controller comprising:
   a processor circuit; and
   a memory having instructions executable by the processor circuit, wherein said processor circuit when executing the instructions is configured to:
   receive from a coordinator of a multi-domain network, a request for virtualizing said one or both of the ingress and the egress end-points of the TE tunnel; and
   virtualize said one or both of the ingress and the egress end-points of the TE tunnel.

25. The physical network controller according to claim 24, wherein said processor circuit when executing the instructions is configured to:
   receive the request by receiving a definition of a virtualized end-point, VEP, of said one or both of the ingress and the egress end-points of the TE tunnel; and
   virtualize said one or both of the ingress and the egress end-points of the TE tunnel, by implementing the virtualized end-point, VEP, of said one or both of the ingress and the egress end-points of the TE tunnel.

26. The physical network controller according to claim 24, wherein the request further comprises a request for selecting one or more access points of the VEP of said one or both of the ingress and egress end-points of the TE tunnel, and wherein said processor circuit when executing the instructions is configured to virtualize said one or both of the ingress and the egress end-points of the TE tunnel by selecting one or more access points of the VEP of said one or both of the ingress and egress end-points of the TE tunnel.

27. The physical network controller according to claim 24, where the TE tunnel is an established TE tunnel and the request is a request for modifying said established TE tunnel into a VEP TE-tunnel.

28. The physical network controller according to claim 24, where the request comprises a request for establishing the TE tunnel having a virtualized end-point, VEP, of one or both of the ingress and the egress end-points.

29. The physical network controller according to claim 24, wherein each domain belongs to an abstraction and control of TE network, ACTN, wherein the second request comprises a definition of a virtualized end-point, VEP, TE tunnel to trigger the physical network controller to implement the VEP TE tunnel.

30. The physical network controller according to claim 25, wherein the definition of the VEP defines the VEP as a virtual entity that contains one or more access points.

* * * * *